United States Patent
Johnstun

(10) Patent No.: US 12,467,364 B1
(45) Date of Patent: Nov. 11, 2025

(54) STRESS REDISTRIBUTION SYSTEM FOR THREADED CONNECTION OF A GAS TURBINE ENGINE SPOOL

(71) Applicant: HONEYWELL INTERNATIONAL INC., Charlotte, NC (US)

(72) Inventor: Clay R. Johnstun, Chandler, AZ (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 0 days.

(21) Appl. No.: 18/926,960

(22) Filed: Oct. 25, 2024

(51) Int. Cl.
 *F01D 5/02* (2006.01)
(52) U.S. Cl.
 CPC .......... *F01D 5/026* (2013.01); *F05D 2240/61* (2013.01); *F05D 2260/31* (2013.01)
(58) Field of Classification Search
 CPC ........ F01D 5/026; F01D 5/06; F05D 2260/31; F16D 1/02; F16D 1/072
 See application file for complete search history.

(56) References Cited

U.S. PATENT DOCUMENTS

| | | | |
|---|---|---|---|
| 2,811,861 A | 11/1957 | Rieser | |
| 4,160,608 A | 7/1979 | Derner et al. | |
| 5,236,302 A * | 8/1993 | Weisgerber | F01D 5/06 415/199.5 |
| 5,533,825 A * | 7/1996 | Stone | F01D 5/026 74/462 |
| 8,540,482 B2 * | 9/2013 | Malmborg | F01D 5/3069 416/198 A |
| 10,184,509 B2 | 1/2019 | Pollitt et al. | |

FOREIGN PATENT DOCUMENTS

CN 105065478 A 11/2015
FR 3116305 A1 * 5/2022

OTHER PUBLICATIONS

Eng-Tips.com; "stepped shaft stress concentration"; desertfox; dated Mar. 28, 2013; accessed/printed Mar. 11, 2025; URL: https://www.eng-tips.com/threads/stepped-shaft-stress-concentration.341861/ (Year: 2013).*

* cited by examiner

*Primary Examiner* — Courtney D Heinle
*Assistant Examiner* — John S Hunter, Jr.
(74) *Attorney, Agent, or Firm* — Ingrassia Fisher & Lorenz, LLP

(57) ABSTRACT

Systems provide load redistribution and reduced stress at otherwise highly loaded threads. A system for a threaded connection includes a shaft that rotates about an axis. The shaft is a hollow cylinder with an inner surface and a wall defined around the inner surface. A fastener is in threaded engagement with the shaft. The fastener applies a compressive load holding the shaft under a tensile load. The threaded connection extends from a loaded end adjacent a place of application of the compressive load, to an unloaded end opposite the loaded end. The inner surface has a contour, and the wall has one thickness at the loaded end and another greater thickness at the unloaded end, so the wall has more compliance at the loaded end as compared to at the unloaded end to reduce a stress resulting from the load and redistributing stress throughout the threaded connection.

20 Claims, 3 Drawing Sheets

STRESS REDISTRIBUTION SYSTEM FOR THREADED CONNECTION OF A GAS TURBINE ENGINE SPOOL

TECHNICAL FIELD

The present disclosure generally relates generally to threaded connections in rotating machinery and, more specifically, to a rotating spool of a gas turbine engine with a system to redistribute stress in a threaded connection.

BACKGROUND

Rotating machinery such as turbine engines may be employed to power various devices. For example, a gas turbine engine may be employed to power a mobile platform, such as aircraft, land vehicles, sea vehicles and other machines. Generally, within rotating machinery, various components are connected together to form rotating assemblies.

In rotating machinery, stress may arise at a number of locations and in particular, around the connections between components. In highly loaded components, stress may be concentrated around the areas where the connections are made. Where high axial clamp loads are used, it is challenging to connect the components while optimizing the assembly from a fatigue perspective. Fatigue is undesirable and may result in material degradation caused by cyclic loading that results in increasing and localized structural changes such as crack initiation and propagation. Once fatigue is initiated, additional loading cycles progressively add to the structural changes and may eventually result in a need for repair.

Accordingly, it is desirable to provide systems for rotating machinery that minimize the effects of fatigue. In addition, it is preferable if such minimization is accomplished without adding mass or complexity to the rotating elements. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

As described herein, systems provide load redistribution and reduced stress at otherwise highly loaded threaded connections. In a number of embodiments, a system for a threaded connection includes a shaft that rotates about an axis. The shaft may be in the form of a hollow cylindrical structure with an inner surface and a wall defined around the inner surface. A fastener is in threaded engagement with the shaft at a threaded connection. The fastener applies a compressive load holding the shaft under a tensile load. The threaded connection extends from a loaded end adjacent a place of application of the compressive load, to an unloaded end opposite the loaded end. The inner surface has a contour so that the wall has one thickness at the loaded end and another greater thickness at the unloaded end so that the wall has more compliance at the loaded end as compared to at the unloaded end. The compliance operates to reduce stress resulting from the load at the loaded end and to redistribute stress throughout the threaded connection.

In a number of other embodiments, systems for a threaded connection include a shaft that rotates about an axis. The shaft is configured as a hollow cylinder with an inner surface and a wall defined around the inner surface, the wall defining the shaft as a tube-like structure. The threaded fastener is threadedly engaged with the shaft at a threaded connection. The threaded fastener applies a compressive load placing the shaft under a tensile load. The threaded connection extends from a loaded end adjacent a loaded interface where the compressive load is applied, to an unloaded end opposite the loaded end. The inner surface has a contour where the wall has a first thickness at the loaded end and a second thickness at the unloaded end that is different than the first thickness so that the wall is configured with more compliance at the loaded end as compared to at the unloaded end. This reduces stress resulting from the load at the loaded end and redistributes the stress throughout the threaded connection.

In a number of additional embodiments, systems for threaded connections include a shaft configured to rotate about an axis. The shaft is a hollow cylinder with an inner surface within the hollow cylinder and the shaft having a wall defined around the inner surface. A fastener is configured for threaded engagement onto the shaft at a threaded connection between the fastener and the shaft. The fastener applies a compressive load holding the shaft under a tensile load. The threaded connection extends from a loaded end in line with a place of application of the compressive load, to an unloaded end opposite the loaded end. The inner surface has a contoured cavity so that the wall has a first thickness at the loaded end and a second thickness at the unloaded end. The first thickness is less than the second thickness so that the wall is configured with more compliance at the loaded end as compared to at the unloaded end. The result is to reduce stress resulting from the load at the loaded end and to redistribute the stress throughout the threaded connection.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
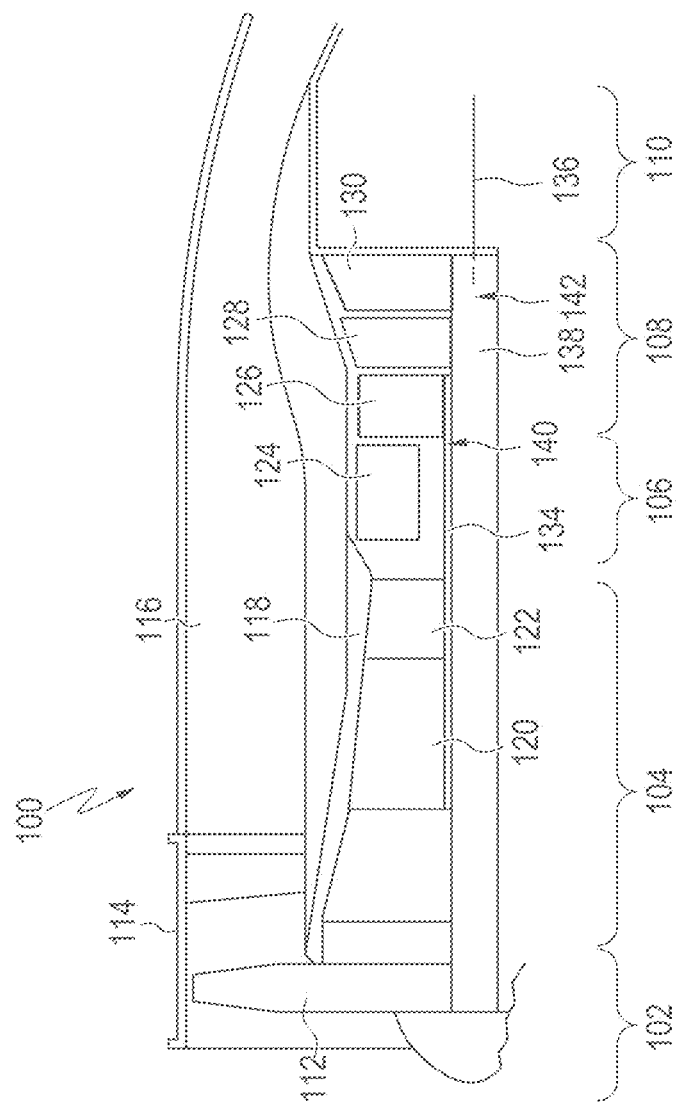
FIG. 1 is a schematic, fragmentary, sectional illustration of a half of a gas turbine engine, according to an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disk with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disk that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The exemplary embodiments disclosed herein provide stress redistribution systems for threaded connections that redistribute loads to divert peak stress away from otherwise highly loaded individual threads. This provides a balancing of the loads carried by the individual threads of the threaded connection thereby avoiding overstressing any individual thread. In embodiments, a threaded connection includes a hollow shaft. A threaded fastener is configured for threaded engagement with the shaft at a threaded connection. The threads have a loaded end, and the inner surface of the hollow shaft is contoured to increase compliance near the loaded end reducing the load on the thread(s) at/near the loaded end and redistributing the load to other threads of the threaded connection. Spreading the load among the threads avoids fatigue that may otherwise initiate at a thread or threads that would otherwise carry a disproportionate share of the load.

Referring to FIG. 1, a cross sectional view of half (the upper half as viewed), of an exemplary engine 100 of the turbofan gas turbine type is schematically illustrated. In general, the engine 100 includes a fan section 102, a compressor section 104, a combustion section 106, a turbine section 108, and an exhaust section 110. The fan section 102 includes a fan 112 mounted on a shaft 138 and contained within a fan casing 114. The fan 112 induces air from the surrounding environment into the engine 100 and passes a fraction of this air toward the compressor section 104.

The compressor section 104 includes at least one compressor and, in the depicted embodiment, includes an axial compressor 120 with a plural number of blade rows/stages and a centrifugal compressor 122 with an impeller. In other embodiments, a different compressor type may be used. The axial compressor 120 raises the pressure of the air directed into it from the fan 112 and directs the compressed air into the centrifugal compressor 122. The centrifugal compressor 122 discharges flow that is directed to the combustion section 106. The compressors 120, 122 are contained within a compressor casing or shroud 118.

The combustion section 106 of the engine 100 includes a combustor 124 in which the high pressure air from the compressors 120, 122 is mixed with fuel and combusted to generate a combustion gas. The combustion gas is then directed into the turbine section 108. The turbine section 108 includes a number of turbines disposed in an axial flow series. The combustion gas from the combustion section 106 expands first through a high pressure turbine 126, passes through the inter-turbine duct 128, and expands again through a low pressure turbine 130, causing the turbine rotors to rotate. The combustion mixture is then exhausted through the exhaust section 110. As the turbines 126 and 130 rotate, each respectively drives equipment in the engine 100 via concentrically disposed shafts 134 and 138 that rotate about an axis 136.

The shaft 134 may be referred to as a high pressure spool tie-shaft. The engine 100 in this example is a multi-spool engine. A high pressure spool 140 includes the high pressure turbine 126, the axial compressor 120, the centrifugal compressor 122 and the shaft 134, which ties the components together in an assembly. As such, the high pressure turbine 126 drives the axial compressor 120 and the centrifugal compressor 122.

A low pressure spool 142 includes the low pressure turbine 130, the fan 112 and the shaft 138. The shaft 134 is a hollow shaft (at least in-part a hollow cylinder or cylindrical shaft), and the shaft 138 extends through the shaft 134.

In other embodiments, other components may be coupled in the low pressure spool 142. In additional embodiments, a different arrangement may be employed. For example, the compressor section 104 may include a low pressure compressor and a high pressure compressor. In such an embodiment, the high pressure spool 140 may include the high pressure compressor and the low pressure spool may include the low pressure compressor. In still other embodiments, the shaft 134 may be assembled with other rotating components, such as in a pump or other rotating machinery type pieces of equipment.

Figure 2:
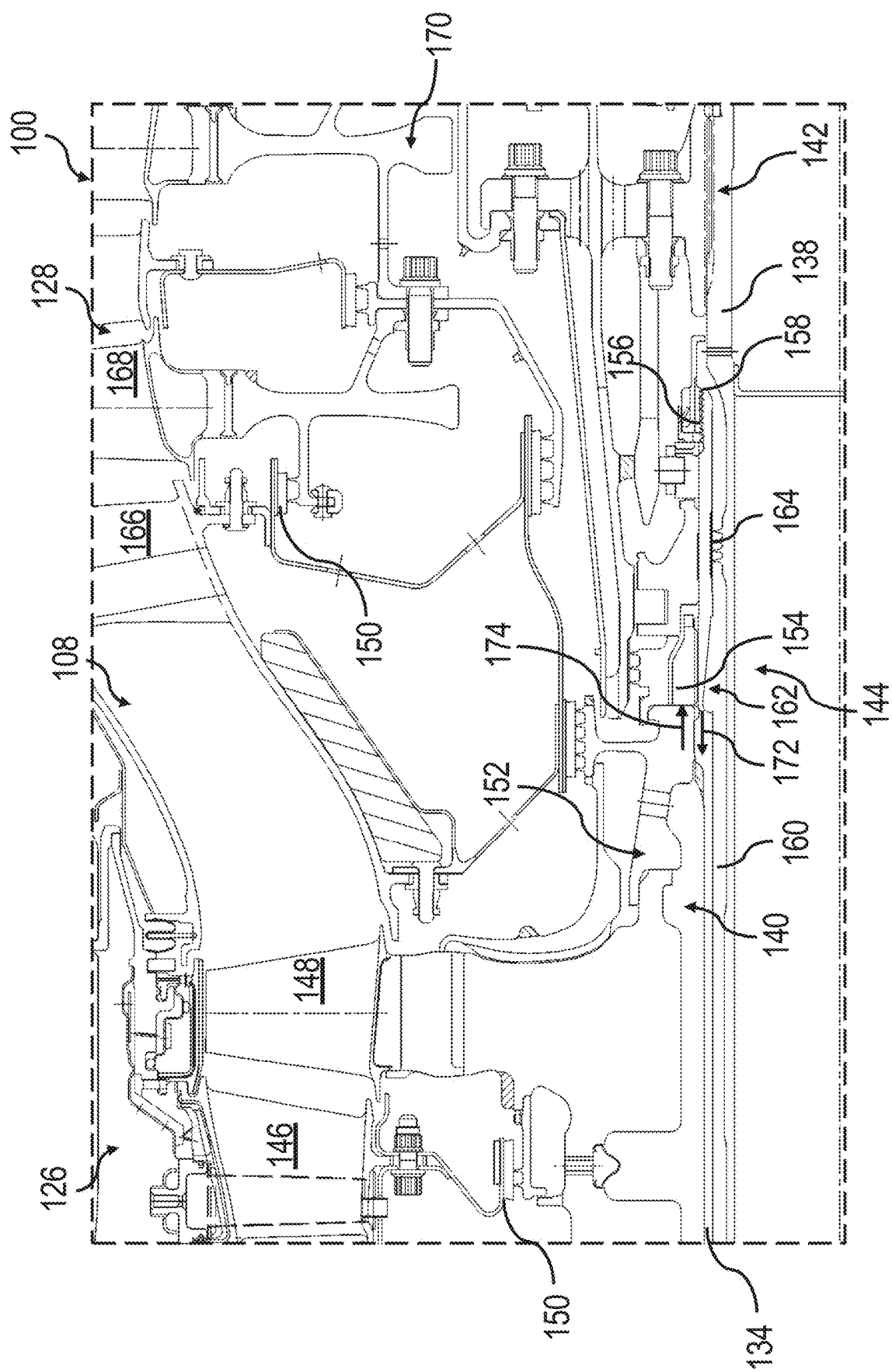
FIG. 2 is a fragmentary, sectional view of a part of the gas turbine engine of FIG. 1 with a stress redistribution system, in accordance with an exemplary embodiment.

Referring additionally to FIG. 2, the area of the engine 100 around the high pressure turbine 126 and the low pressure turbine 130 is shown in greater detail, which shows elements of a stress redistribution system 144. The high pressure turbine 126 includes a number of stationary vanes (e.g. vane 146) and rotating blades (e.g. blade 148). The example vane 146 is connected with the frame 150 of the engine 100. The example blade 148 is connected with the shaft 134 in the high pressure spool 140, along with other blades, in a high pressure turbine rotor stack (stack) 152. The stack 152 is retained on the shaft 134 by a fastener 154 tying the compressors 120, 122 with the high pressure turbine 126 in the high pressure spool 140.

The low pressure turbine 130 includes a number of stationary vanes (e.g. vane 166) and rotating blades (e.g. blade 168). The example vane 166 is connected with the frame 150 of the engine 100. The example blade 168 is connected with the shaft 138 in the low pressure spool 142, along with other blades, in a low pressure turbine rotor stack (stack) 170. The stack 170 is retained on the shaft 138 coupling the fan 112 with the low pressure turbine 130 in the low pressure spool 142.

The shaft 134 has a terminal end 158 on an opposite side of the fastener 154 from the high pressure turbine 126. The fastener 154 is threaded onto the shaft 134 forming a threaded connection 162. An interface 156 may be provided between the shaft 134 and various components near the terminal end 158. A gap 160 is provided between the shaft 134 and the shaft 138 allowing the shafts 134 and 138 to rotate at different speeds from one another. A seal 164 is provided between the shafts 134 and 138.

The high pressure spool 140 rotates at very high speeds and a high preload (axial clamp load) is placed on the shaft 134 during assembly. In the current embodiment, the fastener 154 is form of a nut that is generally annular in shape and that fits over the shaft 134. In an example, a fixture (not shown) with a hydraulic ram and tensioner may apply force on the stack 152 and pull on shaft 134 and then the fastener 154 is torqued. The result is that the threads of the threaded connection 162 bear the load that exists between the shaft 134 and the fastener 154. This means there is a tensile load 172 that exists on the shaft 134. The tensile load 172 is offset by a force 174 on the fastener 154 reacting against the stack 152 with a compressive load between the stack 152 and the fastener 154. The opposite end (FIG. 1) of the shaft 134 may be enlarged or otherwise configured to hold the opposite end of the high pressure spool 140. Stress imparted to the threaded connection 162 is redistributed by the stress redistribution system 144 as further described below.

Figure 3:
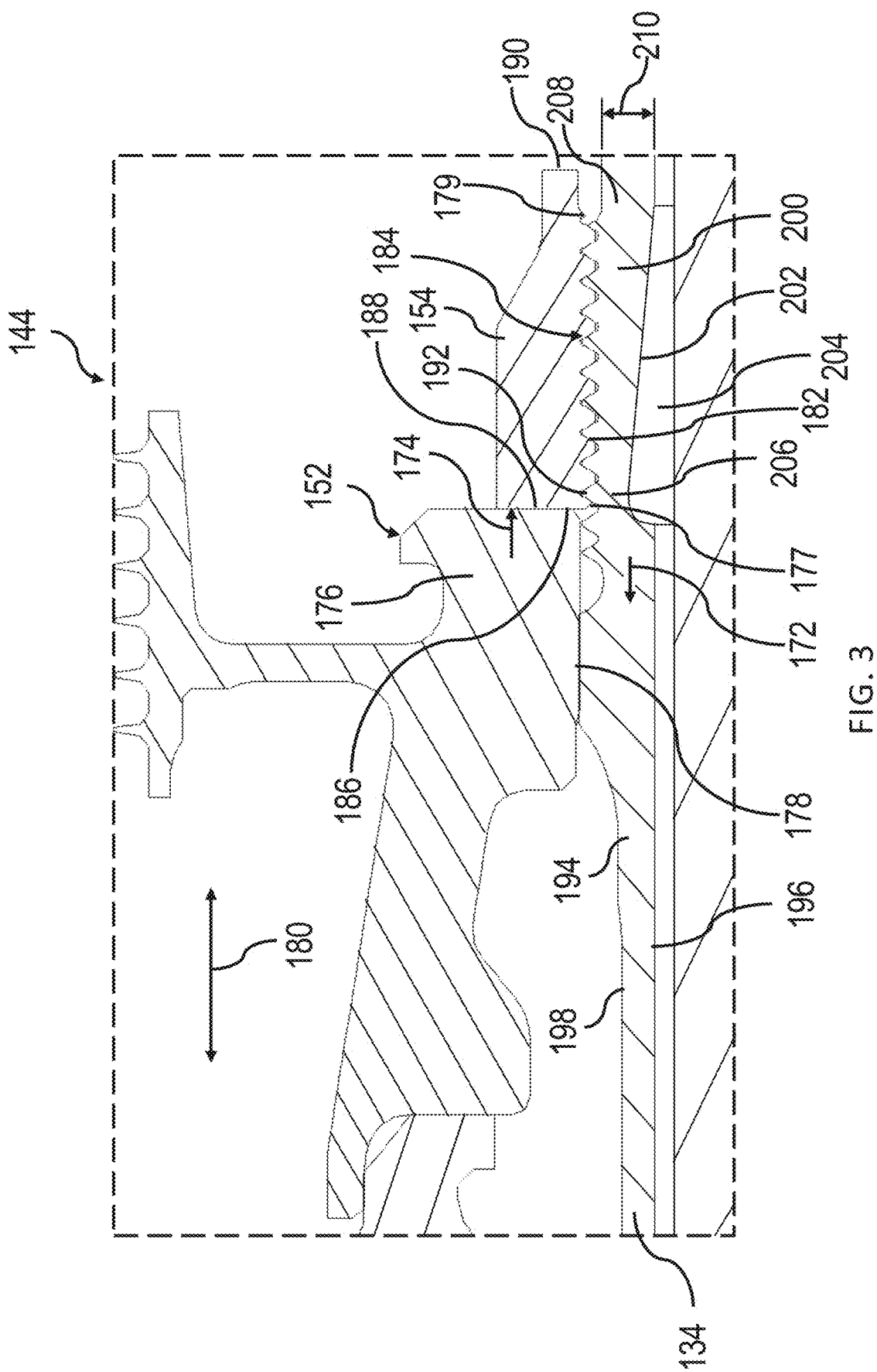
FIG. 3 is a fragmentary, detail view of a part of the stress redistribution system of FIG. 2, in accordance with an exemplary embodiment.

Referring additionally to FIG. 3, the area of the threaded connection 162 is illustrated in greater detail showing the details of the stress redistribution system 144. The stack 152, and in particular a ring 176 at the end of the stack 152, is disposed on the shaft 134 adjacent the threaded connection 162. The ring 176 engages the shaft 134 at a sliding interface 178. The sliding interface 178 allows the ring 176 to slip in an axial direction 180 relative to the shaft 134, in particular under force.

The threaded connection 162 includes internal threads 182 on the fastener 154 and external threads 184 on the shaft 134. An end 186, in the axial direction 180, of the fastener 154 engages the ring 176 at a loaded interface 188. The loaded interface 188 is a place of application of the compressive load. An end 190 of the fastener 154 opposite the loaded interface 188 is free and is therefore unloaded. In the current embodiment, the end 177 of the threaded connection 162 is referred to as the loaded end and the end 179 of the threaded connection 162 is referred to as the unloaded end. The tensile load 172 is applied in an opposite direction to and is equal in magnitude to the compressive load (force 174). The tensile load 172 and the compressive load (force 174) apply stress to the threaded connection 162 in the form of a load. The load is carried by the internal threads 182 and the external threads 184. The first thread 192 of the external threads 184 on the shaft 134 is in jeopardy of being subjected to an inordinate percentage of the total stress on the threaded connection 162. The first thread 192 would bear the largest load, which becomes lower moving away from the loaded interface 188. For example, in the current embodiment, in the absence of the stress redistribution system 144, it has been found as part of the current disclosure that the first thread 192 would be subjected to over half of the total stress applied to all the threads of the entire threaded connection 162.

To redistribute the stress among the various threads of the threaded connection 162 and to reduce the stress borne by the first thread 192, the stress redistribution system 144 imparts compliance to the shaft 134 in its wall 194. It will be appreciated that the wall 194 is a cylindrical or annular wall of the hollow shaft 134, or a section thereof, and so has an inner surface 196 facing and encircling the shaft 138 and an outer surface 198 on which the external threads 184 are formed. The wall 194 defines the section of the shaft 134 at the threaded connection 162 as a tube-like structure. The force 174 results in a number of vector forces in the wall 194 including those directed along the axis 136 and those directed (directly or at angles) toward the axis 136.

To spread the load and to divert peak stress away from first thread 192, the inner surface 196 of the wall 194 has a contour with a section 200 that is thinned. This thin-wall section 200 includes a surface 202 that is tapered so that the thinnest part of the section 200 of the wall 194 is disposed radially inward from the first thread 192 and the thickest part of the section 200 of the wall 194 is at the unloaded end 190 and more specifically at the point radially inward from the end of the threads of the threaded connection 162 adjacent, or on the side toward the unloaded end 190. In this context, radially inward from, means on a line from the threads to the axis 136, where the line is normal to the axis 136. The contour is tapered in a straight line from the loaded end 186 to the unloaded end 190 defining a conical-like void in the shaft 134. In embodiments, the section 200 is formed by removing material from the inside of the shaft 134 forming a cavity 204 in the shaft 134 in the inner surface 196. The cavity 204 extends completely around the axis 136 three-hundred-sixty degrees. In the current embodiment, the surface 202 is smoothly tapered in the axial direction 180. In other embodiments, the taper may be tuned to be stepped or ramped at various angles to distribute the load among the threads. The contour has a smoothly rounded corner near the loaded end 186 to avoid concentrating stresses.

The result of the cavity 204 is that the wall 194 at the point 206 in line with the first thread 192 is more compliant than at other areas. At the point 208 the thickness 210 of the wall 194 returns to its standard nonreduced value. This compliance imparts flexibility to the shaft 134 at a location where allowing deformation lowers the share of the load on the threads of the threaded connection 162. For example, the load that would otherwise be carried by the first thread 192 is redistributed toward the unloaded end 190 and away from the loaded end 186. Spreading the load amongst other threads reduces the initiation of fatigue in the shaft 134. The stress redistribution system 144 enables the use of standard straight threads for both the internal threads 182 and the external threads 184 beneficially simplifying construction.

Accordingly, the thickness 210 of the wall 194 of the shaft 134 is varied to redistribute stress from those threads that would otherwise carry more than their proportional share of the load on the threaded connection 162 to other threads. This balances the load carried by the threads in an equalized manner so that each thread carries it proportionate share of the load. In an embodiment, the load is redistributed from a first thread 192 adjacent or at the location of the loaded interface 188 along the axis 136 to other threads further from the loaded interface 188 along the axis 136. This reduces the risk of fatigue initiation and increases the service life of the threaded connection 162 and its components. In the embodiment of the gas turbine engine 100, the stress redistribution system 144 may be used in the assembly of the high pressure spool 140 and in other locations where applicable. In addition, the stress redistribution system 144 may be used in other rotating machinery applications where stress redistribution/diversion is desirable.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for a threaded connection, the system comprising:
   a shaft configured to rotate about an axis, the shaft configured as a hollow cylinder with an inner surface and a wall defined around the inner surface; and
   a fastener configured for threaded engagement with the shaft at a threaded connection, the fastener configured to apply a compressive load holding the shaft under a tensile load, the threaded connection extending from a loaded end adjacent a place of application of the compressive load, to an unloaded end opposite the loaded end,
   wherein the threaded connection is defined along the axis by the nut and threads on the shaft,
   wherein the inner surface is configured with a contour so that the wall has a first thickness at the loaded end and a second thickness at the unloaded end that is different than the first thickness,
   wherein the contour forms a void along an axial length of the threaded connection and on an opposite side of the wall from the threaded connection, wherein the void is disposed axially solely within the threaded connection, wherein the wall has a varying thickness that extends from the loaded end to the unloaded end where the wall is thinner than a standard thickness of the wall outside the contour,
   wherein the wall is configured with more compliance at the loaded end as compared to at the unloaded end to reduce a stress resulting from the load at the loaded end and to redistribute the stress throughout the threaded connection.

2. The system of claim 1, wherein the contour forms a cavity in the inner surface, the cavity extending completely around the axis, wherein the threaded connection has a first thread at the loaded end, wherein the wall, at a point in line with the first thread, has a thickness that is at a minimum where the shaft is more compliant than at other areas of the shaft outside the contour.

3. The system of claim 1, wherein the contour extends from a first point radially inward from the loaded end to a second point radially inward from the unloaded end, wherein the wall is reduced in thickness for an entire distance from the loaded end to the unloaded end, as compared to wall outside the contour.

4. The system of claim 1, wherein the shaft comprises a first shaft and comprising a second shaft extending through the first shaft.

5. The system of claim 1, comprising a turbine rotor stack having a ring extending around the shaft, wherein the shaft and the ring engage one another at a sliding interface, wherein the ring is configured to slide along the shaft at the sliding interface, wherein the ring includes a surface that is radially inward facing at the sliding interface, wherein the surface has a first end that extends axially over the threads on the shaft and has a second end that extends axially over a space between the shaft and the ring on an opposite from the first end, and wherein the compressive load is established between the fastener and the ring.

6. The system of claim 1, wherein the shaft comprises a high pressure spool tie-shaft of a gas turbine engine, and comprising a turbine rotor stack having a ring extending around the shaft, wherein the shaft and the ring engage one another at a sliding interface, wherein the shaft includes external threads that extend axially into the ring.

7. The system of claim 1, wherein the fastener has internal threads, and the shaft has external threads engaged with the internal threads at the threaded connection.

8. The system of claim 1, wherein the shaft is under a preload resulting in the load.

9. The system of claim 1, wherein the threaded connection includes a first thread at the loaded end, wherein the stress on the first thread is balanced throughout threads of the threaded connection by the wall radially outside the void which is tapered in a straight line from the loaded end to the unloaded end, wherein the wall around the void is thinnest at the loaded end and is thickest at the unloaded end.

10. The system of claim 1, wherein the contour is tapered in a straight line from the loaded end to the unloaded end with a rounded corner at the loaded end configured to avoid concentrating stresses.

11. A system for a threaded connection, the system comprising:
    a shaft configured to rotate about an axis, the shaft configured as a hollow cylinder with an inner surface and a wall defined around the inner surface, the wall defining a section of the shaft as a tube-like structure; and a threaded fastener threadedly engaged with the shaft at a threaded connection, the threaded fastener applying a compressive load placing the shaft under a tensile load, the threaded connection extending from a loaded end adjacent a loaded interface where the compressive load is applied, to an unloaded end opposite the loaded end, wherein the threaded connection is defined along the axis by the nut and threads on the shaft, wherein the inner surface is configured with a contour so that the wall has a first thickness at the loaded end and a second thickness at the unloaded end that is different than the first thickness, wherein the contour forms a void along an axial length of the threaded connection and on an opposite side of the wall from the threaded connection, wherein the void is disposed axially solely within the threaded connection, wherein the wall has a varying thickness that extends from the loaded end to the unloaded end where the wall is thinner than a standard thickness of the wall outside the contour, wherein the wall is configured with more compliance at the loaded end as compared to at the unloaded end to reduce a stress resulting from the load at the loaded end and to redistribute the stress throughout threads of the threaded connection.

12. The system of claim 11, wherein the contour forms a cavity in the inner surface, the cavity extending radially outward and completely around the axis, wherein the threaded connection has a first thread at the loaded end, wherein the wall, at a point in line with the first thread, has a thickness that is at a minimum where the shaft is more compliant than at other areas of the shaft outside the contour.

13. The system of claim 11, wherein the contour extends from a first point directly radially inward from the loaded end to a second point directly radially inward from the unloaded end, where directly radially inward means along a line normal to the axis, wherein the wall is reduced in thickness for an entire distance from the loaded end to the unloaded end, as compared to wall outside the contour.

14. The system of claim 11, wherein the shaft comprises a first shaft and comprising a second shaft extending through the first shaft, wherein the first shaft and the second shaft are configured to rotate relative to one another.

15. The system of claim 11, comprising a turbine rotor stack having a ring extending around the shaft as a part of a high pressure spool stack of a gas turbine engine, wherein the shaft and the ring engage one another at a sliding interface, wherein the ring is configured to slide along the shaft at the sliding interface, wherein the ring includes a surface that is radially inward facing at the sliding interface, wherein the surface has a first end that extends axially over the threads on the shaft and has a second end that extends axially over a space between the shaft and the ring on an opposite from the first end, and wherein the compressive load is established between the fastener and the ring.

16. The system of claim 11, wherein the shaft comprises a high pressure spool tie-shaft of a gas turbine engine that ties a compressor to a turbine, and comprising a turbine rotor stack having a ring extending around the shaft, wherein the shaft and the ring engage one another at a sliding interface, wherein the shaft includes external threads that extend axially into the ring.

17. The system of claim 11, wherein the fastener comprises a nut that has internal threads, and the shaft has external threads engaged with the internal threads.

18. The system of claim 11, wherein the threaded connection includes a first thread at the loaded end, wherein the stress on the first thread is distributed throughout the threaded connection and is balanced on individual threads throughout the threaded connection.

19. The system of claim 11, wherein the contour is tapered in a straight line from the loaded end to the unloaded end forming a conical-like cavity in the shaft, wherein the wall around the contour is thinnest at the loaded end and is thickest at the unloaded end.

20. A system for a threaded connection, the system comprising:
a shaft configured to rotate about an axis, the shaft configured as a hollow cylinder with an inner surface within the hollow cylinder and the shaft having a wall defined around the inner surface; and
a fastener configured for threaded engagement onto the shaft at a threaded connection between the fastener and the shaft, the fastener configured to apply a compressive load holding the shaft under a tensile load, the threaded connection extending from a loaded end in line with a place of application of the compressive load, to an unloaded end opposite the loaded end,
wherein the threaded connection is defined along the axis by the nut and threads on the shaft,
wherein the inner surface is configured with a contoured cavity so that the wall has a first thickness at the loaded end and a second thickness at the unloaded end,
wherein the first thickness is less than the second thickness so that the wall is configured with more compliance at the loaded end as compared to at the unloaded end to reduce a stress resulting from the load at the loaded end and to redistribute the stress to threads throughout the threaded connection,
wherein the contoured cavity forms a void along an axial length of the threaded connection and on an opposite side of the wall from the threaded connection, wherein the void is disposed axially solely within the threaded connection.

* * * * *